(12) United States Patent
Cadiz et al.

(10) Patent No.: US 7,801,954 B2
(45) Date of Patent: Sep. 21, 2010

(54) METHOD AND SYSTEM FOR PROVIDING EXPANDED PRESENCE INFORMATION WHEN A USER IS OFFLINE

(75) Inventors: Jonathan J. Cadiz, Redmond, WA (US); Eran Shtiegman, Redmond, WA (US); Amritansh Raghav, Seattle, WA (US); Venkateshaiah Setty, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1065 days.

(21) Appl. No.: 11/067,503

(22) Filed: Feb. 25, 2005

(65) Prior Publication Data

US 2006/0195587 A1 Aug. 31, 2006

(51) Int. Cl.
*G06F 15/16* (2006.01)

(52) U.S. Cl. ...................... 709/204; 709/206

(58) Field of Classification Search ............. 709/204, 709/206

See application file for complete search history.

(56) References Cited

U.S. PATENT DOCUMENTS

| | | | | |
|---|---|---|---|---|
| 6,988,128 | B1* | 1/2006 | Alexander et al. | 709/206 |
| 7,149,288 | B2* | 12/2006 | Digate et al. | 709/205 |
| 7,284,002 | B2* | 10/2007 | Doss et al. | 709/205 |
| 7,302,634 | B2* | 11/2007 | Lucovsky et al. | 709/203 |
| 7,305,437 | B2* | 12/2007 | Horvitz et al. | 709/204 |
| 7,383,308 | B1* | 6/2008 | Groves et al. | 709/206 |
| 2002/0184089 | A1* | 12/2002 | Tsou et al. | 709/206 |
| 2003/0037112 | A1 | 2/2003 | Fitzpatrick et al. | |
| 2003/0065721 | A1 | 4/2003 | Roskind | |
| 2004/0030741 | A1 | 2/2004 | Wolton et al. | |
| 2004/0128358 | A1 | 7/2004 | Apfel et al. | |
| 2004/0161090 | A1* | 8/2004 | Digate et al. | 709/204 |
| 2004/0162882 | A1* | 8/2004 | Mora | 709/207 |
| 2004/0186896 | A1 | 9/2004 | Daniell et al. | |
| 2004/0205200 | A1 | 10/2004 | Kothari et al. | |
| 2005/0198321 | A1* | 9/2005 | Blohm | 709/228 |
| 2005/0216563 | A1* | 9/2005 | Stewart et al. | 709/206 |
| 2005/0246415 | A1* | 11/2005 | Belfiore et al. | 709/203 |

OTHER PUBLICATIONS

DirFile.com, the best freeware resource, 6 pages, http://www.dirfile.com/freeware/icq.htm [last accessed Jan. 3, 2007].

* cited by examiner

*Primary Examiner*—Phuoc Nguyen
(74) *Attorney, Agent, or Firm*—Perkins Coie LLP

(57) ABSTRACT

A method and system for providing expanded presence information of publishers to subscribers is provided. The presence system receives expanded presence information from a publisher. A client component of the presence system sends the expanded presence information to a presence server of the presence system. Upon receiving the expanded presence information, the presence server stores the expanded presence information in association with the publisher. When the presence server is to provide the presence information of a publisher to subscribers, the presence server identifies the current presence state of the publisher and retrieves the expanded presence information. The presence server then provides the current presence state and the expanded presence information to the subscribers.

18 Claims, 5 Drawing Sheets

Presence Information

Out of Office Message:

201 ☐ [                    ]

Contact Info:
- phone no.: _____
- email: _____
- location: _____
- time zone: _____
- alt contact: _____

202

203 ☐ calendar 204 ( Submit )

FIG. 2

"METHOD AND SYSTEM FOR PROVIDING EXPANDED PRESENCE INFORMATION WHEN A USER IS OFFLINE"

TECHNICAL FIELD

The described technology relates generally to providing notifications of changes to presence information.

BACKGROUND

Real-time conversations between conversation participants via their computer systems are becoming increasingly common. Such real-time conversations require that the participants be present at their computer systems (e.g., personal digital assistants) and able to respond when a communication is received. A common form of real-time conversation is provided by instant messaging services. An instant messaging service allows participants to send messages and have them received within a second or two by the other participants in the conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

When an initiating participant wants to start a real-time conversation, that participant needs to know whether the intended participants are available to respond in real time to a message. If not, then communications via conventional electronic mail, voice mail, or some other mechanism may be more appropriate. For example, if the computers of the intended participants are currently powered off, then a real-time conversation may not be possible. Moreover, if their computers are currently powered on, but the intended participants are away from their computers, a real-time conversation is also not possible. The initiating participant would like to know the availability of the intended participants so that an appropriate decision on the form of communication can be made.

The availability status of an entity such as a computer system or a user associated with that computer system is referred to as "presence information." Presence information identifies the current "presence state" of the user. Users make their presence information available so that other users can decide how best to communicate with them. For example, the presence information may indicate whether a user is logged on ("online") with an instant messaging server or is logged off ("offline"). Presence information may also provide more detailed information about the availability of the user. For example, even though a user is online, that user may be away from their computer in a meeting. In such a case, the presence state may indicate "online" and "in a meeting."

In an instant messaging context, a publishing user ("publisher") may provide their presence information to a presence server that then provides the presence information to subscribing users ("subscribers"). Thus, a presence server may use a subscriber/publisher model to provide the presence information for the users of the presence service. Whenever the presence information of a user changes, the presence server is notified of the change by that user's computer system and in turn notifies the subscribing users of the change. A subscribing user can then decide whether to initiate an instant messaging conversation based on the presence information of the intended participants. For example, if the presence information indicates that a publishing user is currently in a conference telephone call, then the subscribing user may decide to send an instant message, rather than place a telephone call, to the publishing user.

When a publisher is offline, presence servers typically only provide a notification that the user is offline. While it can be important for a subscriber to know whether a publisher is currently offline, it would be desirable for the presence server to provide more detailed presence information when a publisher is offline.

SUMMARY

A method and system for providing expanded presence information of publishers to subscribers is provided. The presence system receives expanded presence information from a publisher. The expanded presence information can be supplied by the publisher or automatically retrieved from various data sources using a client component of the presence system. The client component sends the expanded presence information to a presence server of the presence system. Upon receiving the expanded presence information, the presence server stores the expanded presence information in association with the publisher. When the presence server is to provide the presence information of a publisher to subscribers, the presence server identifies the current presence state of the publisher and retrieves the expanded presence information. The presence server then provides the current presence state and the expanded presence information to the subscribers.

BRIEF DESCRIPTION OF THE DRAWINGS

FIG. 2 is a display page that illustrates input of expanded presence information by a subscriber in one embodiment.

DETAILED DESCRIPTION

Figure 1:
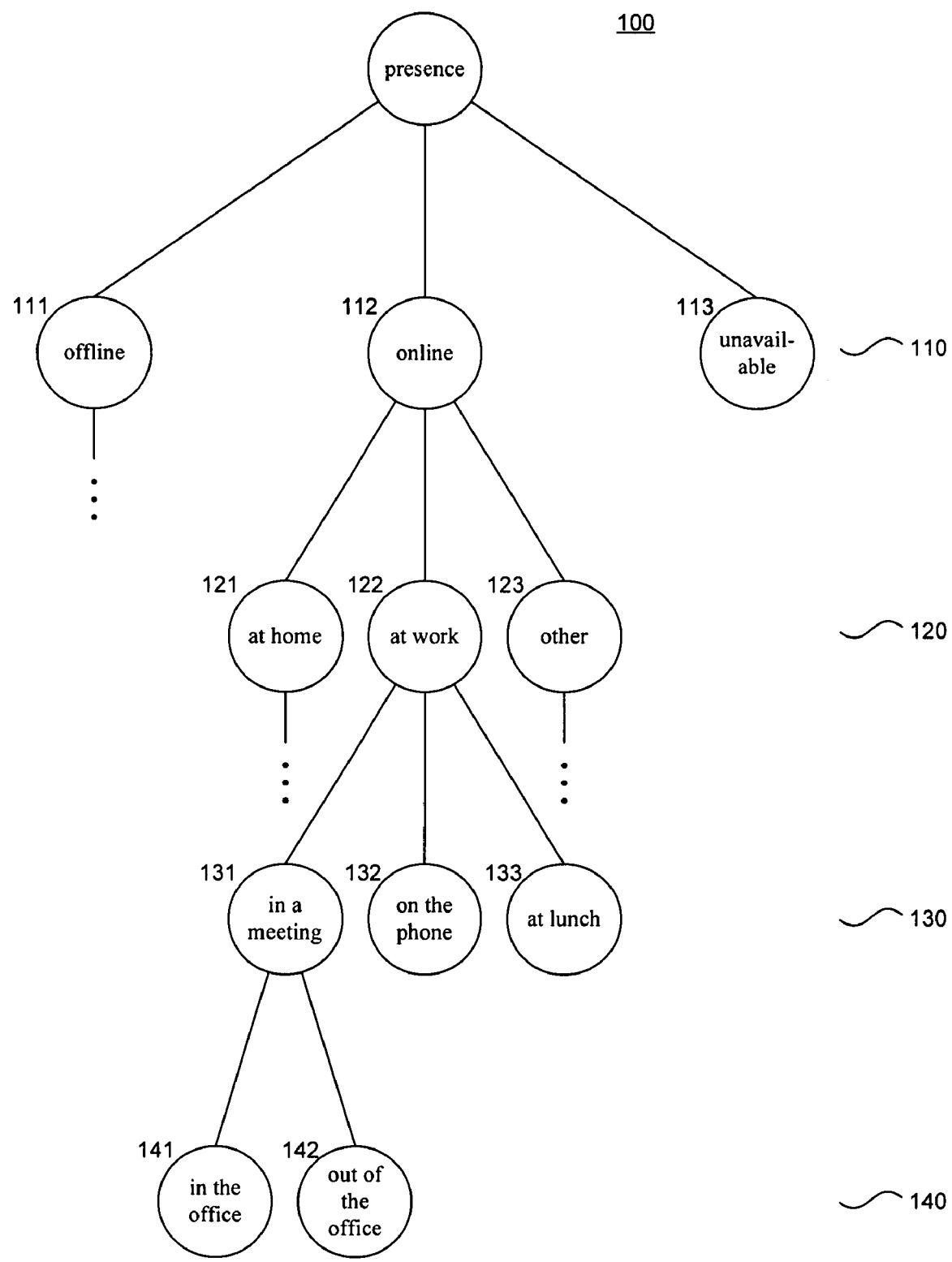
FIG. 1 is a diagram illustrating a presence model of presence states in one embodiment.

A method and system for providing expanded presence information of publishers to subscribers is provided. In one embodiment, the presence system receives expanded presence information from a publisher. For example, the expanded presence information may include calendar information, an out-of-office message, publisher contact information (e.g., electronic mail address), information provided by an enterprise (e.g., employer) associated with the publisher such as the URL of the enterprise's web site, and so on. The expanded presence information can be supplied by the publisher or automatically retrieved from various data sources using a client component of the presence system. For example, calendar information may be retrieved from the publisher's calendaring system. As another example, the out-of-office message may be automatically retrieved from an electronic mail system that supports out-of-office notifications. The client component sends the expanded presence information to a presence server of the presence system. Upon receiving the expanded presence information, the presence server stores the expanded presence information in association with the publisher. When the presence server is to provide the presence information of a publisher to subscribers, the presence server identifies the current presence state of the publisher and retrieves the expanded presence information. The presence server then provides the current presence state and the expanded presence information to the subscribers. The presence server may provide the expanded presence information when the publisher is offline or online. Whenever the presence server receives from a publisher an update to the publisher's expanded presence information, the presence server may provide to the subscribers the updated presence information. In this way, subscribers can view expanded presence information of publishers that are currently offline.

In one embodiment, the presence system provides calendar information of a publisher to subscribers. The presence server receives calendar information from publishers of presence information. The calendar information may be automatically extracted from the data of the publisher's calendaring system or the client component. The calendar information may identify the days and times when the publisher will be available, out of the office, in a meeting, and so on. The publisher may provide the calendar information on an incremental basis. For example, when the publisher schedules a new meeting, the publisher's calendaring system or the client component of the presence system may provide the updated calendar information into the presence server. Upon receiving the calendar information of a publisher, the presence server stores the calendar information in association with the publisher. When the publisher's presence state changes or the calendar information changes, the presence server notifies the subscribers of the new presence state and provides the calendar information. The presence server may also provide the calendar information to subscribers while the publisher is offline. For example, when a subscriber subscribes to the presence information of a publisher that is offline, the presence server provides to subscriber an indication that the publisher is offline along with the publisher's calendar information.

FIG. 1 is a diagram illustrating a presence model of presence states in one embodiment. The presence model 100 defines a hierarchy of presence states of a publishing entity, such as a user, client or computer system. The first-level presence states 110 are "offline" 111, "online" 112, and "unavailable" 113. "Offline" indicates that the publishing entity is not currently available, "online" indicates that the publishing entity is currently logged on to the presence server, and "unavailable" indicates that no presence information is currently available. The second-level presence states 120 of the "online" presence state are "at home" 121, "at work" 122, and "other" 123. "At home" indicates that the publishing entity is online at home, "at work" indicates that the publishing entity is online at work, and "other" indicates that the publishing entity is online at some other location. The third-level presence states 130 of the "at work" presence state are "in a meeting" 131, "on the phone" 132, and "at lunch" 133, which are self-descriptive. The fourth-level presence states 140 of the "in a meeting" presence state are "in the office" 141 and "out of the office" 142, which are also self-descriptive. A user may be allowed to define the hierarchy of presence states of a presence model and to define multiple presence models. The presence system may allow contacts to define in which presence states they are available to communicate and the method or methods of communication that are allowed or desirable in each presence state. The presence system may also allow a user to select for which presence states of contacts the user wants to be notified.

FIG. 2 is a display page that illustrates input of expanded presence information by a subscriber in one embodiment. The display page 200 includes an out-of-office message area 201, a contact information area 202, a calendar checkbox 203, and a submit button 204. The client component of the presence system provides this display page when a publisher wants to update their expanded presence information. The publisher may enter an out-of-office message in the out-of-office message area and select the checkbox to indicate that the out-of-office message should be included in the expanded presence information. The publisher can provide contact information in the contact information area such as their telephone number, electronic mail address, location (e.g., Hawaii), time zone, alternate contact (e.g., supervisor or assistant), and so on. The publisher selects the calendar checkbox to indicate that the calendar information of the publisher is to be included in the expanded presence information. When the publisher selects the submit button, the client component may collect additional presence information (e.g., employer's name) and send the publisher-supplied presence information along with the additional presence information as the expanded presence information to the presence server.

Figure 3:
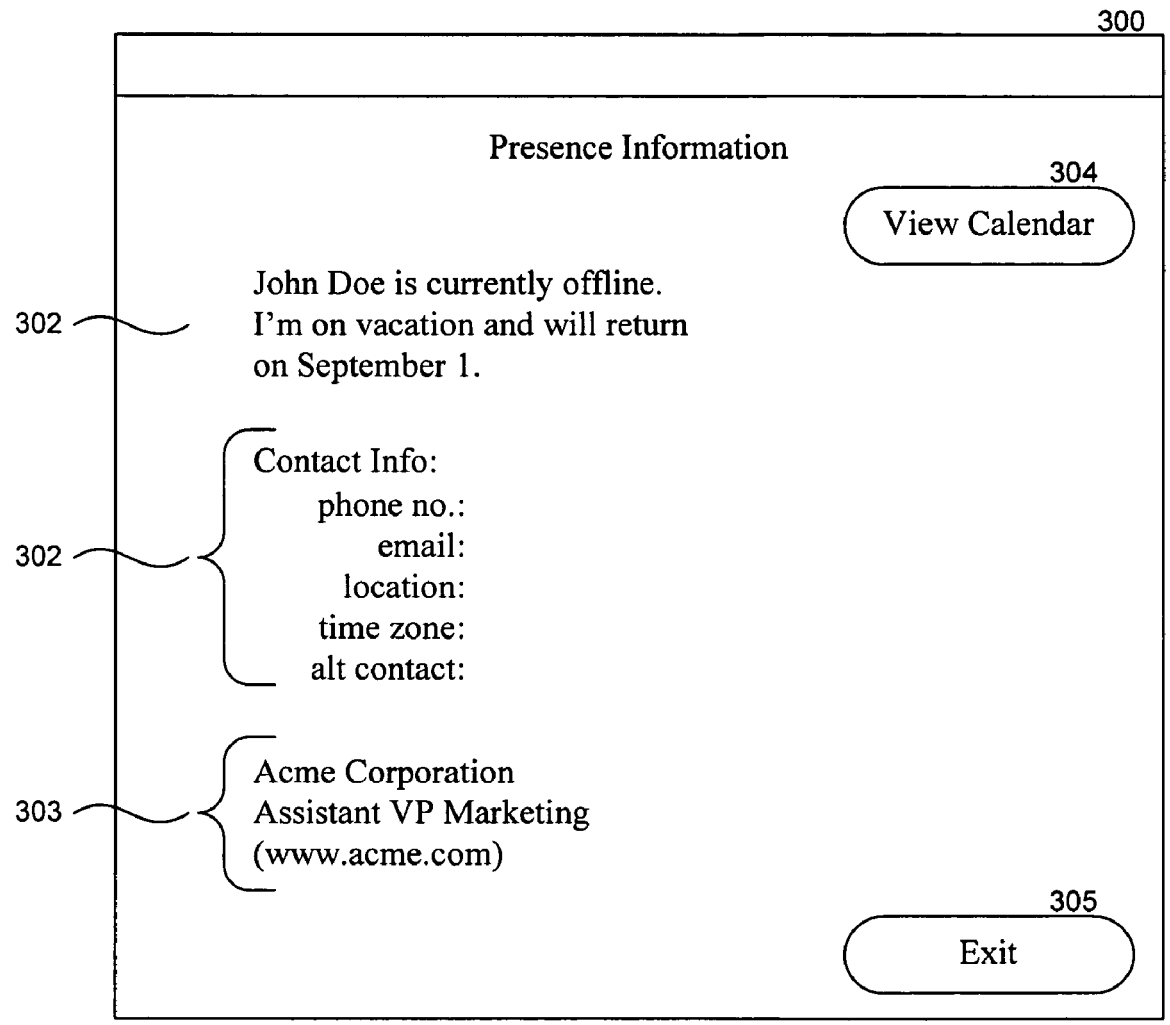
FIG. 3 is a display page that illustrates the display of expanded presence information of a publisher in one embodiment.

FIG. 3 is a display page that illustrates the display of expanded presence information of a publisher in one embodiment. The display page 300 includes an out-of-office area 301, a contact information area 302, an additional information area 303, a view calendar button 304, and an exit button 305. A client component of the presence system may display this display page when a subscriber selects to view more detailed information about a contact. The out-of-office area includes the out-of-office message, if any, provided by the publisher. The contact information area provides the contact information provided by the publisher. The additional information area includes information added to the expanded contact information that may be automatically collected from the publisher's computer or provided by the publisher's associated enterprise. When the subscriber selects the view calendar button, the calendar information of the publisher is displayed. When the subscriber is done, the subscriber selects the exit button.

Figure 4:
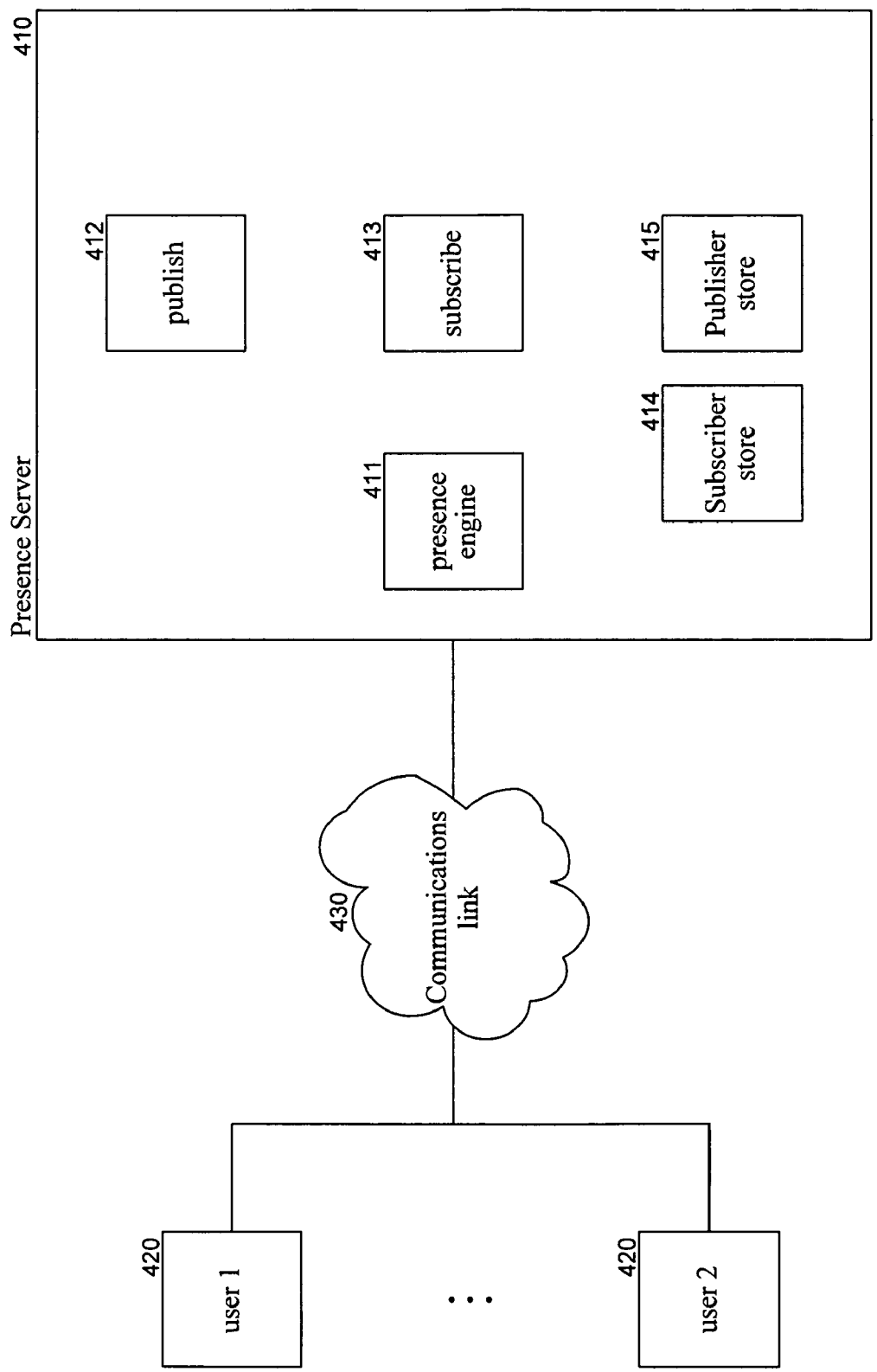
FIG. 4 is a block diagram that illustrates components of the presence system in one embodiment.

FIG. 4 is a block diagram that illustrates components of the presence system in one embodiment. The presence system includes the presence server 410 connected to user systems 420 via a communications link 430. The presence server includes server components such as a presence engine 411, a publish component 412, a subscribe component 413, a subscriber store 414, and a publisher store 415. The presence engine receives requests to subscribe to presence information and requests to update presence information. The presence engine invokes the publish component or the subscribe component as appropriate. The publish component receives from publishers updated presence state information along with their expanded presence information. The publish component stores the presence state information and the expanded presence information in the publisher store. The publish component also notifies subscribers of changes to presence state information and expanded presence information of the publishers. The subscribe component receives requests from subscribers to subscribe to presence information of publishers. The subscribe component stores the subscription information in the subscriber store. The user system includes client components of the presence system that collect the expanded presence information and provide it to the presence server.

The computing device on which the presence system is implemented may include a central processing unit, memory, input devices (e.g., keyboard and pointing devices), output devices (e.g., display devices), and storage devices (e.g., disk drives). The memory and storage devices are computer-readable media that may contain instructions that implement the presence system. In addition, the data structures and message structures may be stored or transmitted via a data transmission medium, such as a signal on a communications link. Various communications links may be used, such as the Internet, a local area network, a wide area network, a point-to-point dial-up connection, a cell phone network, and so on.

Embodiments of the presence system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The presence system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
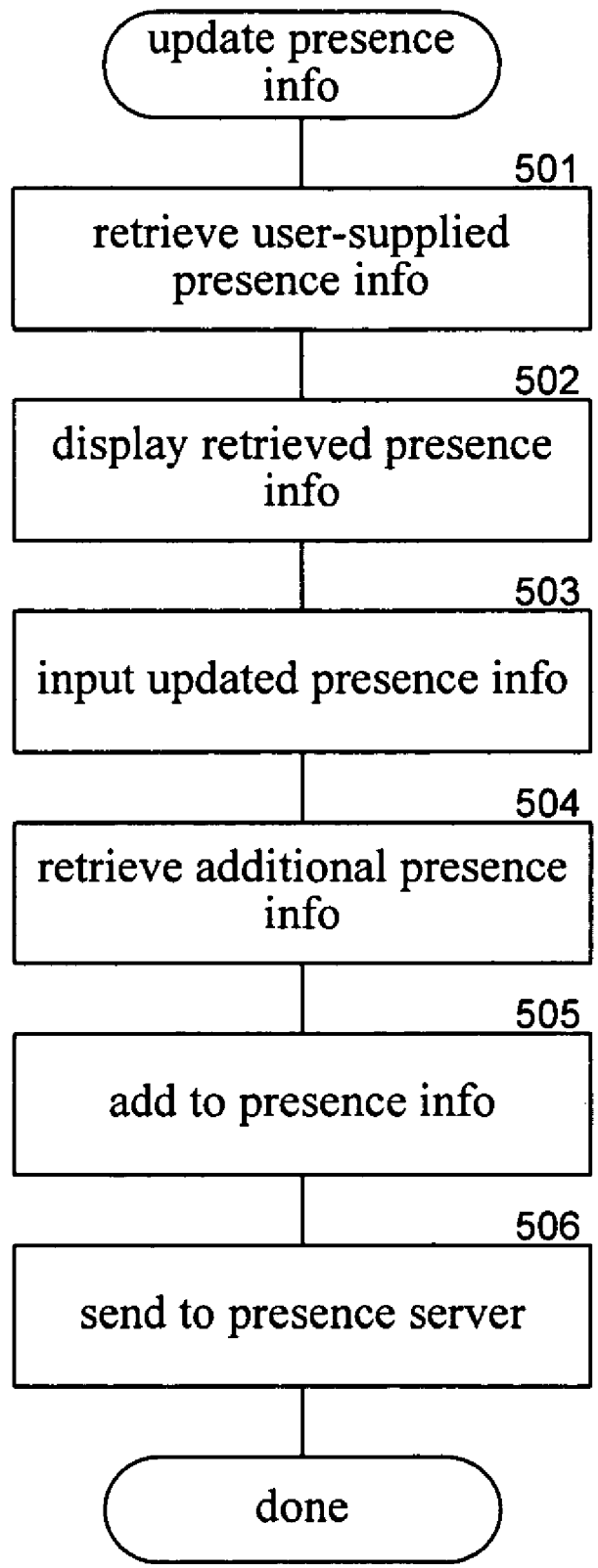
FIG. 5 is a flow diagram that illustrates the processing of an update presence information component of a client component of the presence system in one embodiment.

FIG. 5 is a flow diagram that illustrates the processing of an update presence information component of a client component of the presence system in one embodiment. The component controls the collecting of expanded presence information as illustrated by FIG. 2. In block 501, the component retrieves the publisher-supplied presence information that the publisher previously provided. In block 502, the component displays the retrieved presence information to the publisher using, for example, the display page of FIG. 2. In block 503, the component inputs the updated presence information from the subscriber. The component also stores the updated presence information locally. In block 504, the component retrieves additional presence information such as calendar information, enterprise-defined presence information, and so on. In block 505, the component adds the retrieved additional presence information to the subscriber-supplied presence information to generate the expanded presence information. In block 506, the component sends the expanded presence information to the presence server and then completes.

From the foregoing, it will be appreciated that specific embodiments of the presence system have been described herein for purposes of illustration, but that various modifications may be made without deviating from the spirit and scope of the invention. In one embodiment, the presence system may associate a time stamp with the expanded presence information that is stored while a publisher is offline. The presence system may display this time stamp along with the extended presence information so that a subscriber will know the age of the information. Knowledge of the age is helpful, for example, when an out-of-office message indicates that the publisher is on vacation for 2 weeks, but the publisher forgets to put the start date of the vacation in the message. Accordingly, the invention is not limited except as by the appended claims.

We claim:

1. A method in a server for providing expanded presence information, the method comprising:
   for each of a plurality of publishers of presence information,
      receiving from the publisher of presence information a definition of a presence model specifying a hierarchy of levels of presence states of the publisher and specifying presence states in which the publisher is online and offline and in which the publisher is available to communicate and a method of communication for the presence states, the hierarchy of levels of presence states including first-level presence states, each first-level presence state including second-level presence states that define presence states classified within the first-level presence state, such that the definition of the presence model of a first publisher is different from the definition of the presence model of a second publisher;
      storing the received definition of the presence model of the publisher;
      receiving expanded presence information from the publisher of presence information, the expanded presence information being information other than the presence information defined by the presence model of the publisher;
      receiving an indication of a current presence state of the publisher, the current presence state being a presence state within the presence model of the publisher; and
      storing the indication of the current presence state and the expanded presence information in association with the publisher;
   receiving from a subscriber a request to subscribe to presence information of a target publisher;
   determining from the stored definition of the presence model of the target publisher and the stored indication of the current presence state of the target publisher whether the target publisher's current present state is offline;
   when the target publisher's current presence state is not an offline presence state, providing to the subscriber the indication of the current presence state of the target publisher and an indication of whether the publisher is available to communicate and a method of communication as specified by the stored definition of the presence model of the target publisher; and
   when the target publisher's presence state is an offline presence state, providing to the subscriber an indication that the target publisher is offline along with the stored expanded presence information of the target publisher.

2. The method of claim 1 including providing the expanded presence information to a subscriber when the target publisher is online.

3. The method of claim 1 wherein the expanded presence information includes an out-of-office message.

4. The method of claim 1 wherein the expanded presence information includes information automatically collected from data sources associated with the publisher.

5. The method of claim 1 wherein the expanded presence information includes calendar information.

6. The method of claim 1 including providing the expanded presence information to subscribers whenever the target publisher's presence state changes.

7. A method in a server for providing calendar information of publishers of presence information to subscribers, the method comprising:
   for each of a plurality of publishers of presence information,
      receiving from the publisher of presence information a definition of a presence model specifying a hierarchy of levels of presence states of the publisher and specifying presence states in which the publisher is available to communicate and a method of communication for the presence states, the hierarchy of levels of presence states including first-level presence states and second-level presence states within each first-level presence state;

storing the received definition of the presence model of the publisher;

receiving calendar information of the publisher of presence information; and storing the received calendar information in association with the publisher;

receiving an indication of a current presence state of a target publisher; and when the received indication indicates that the target publisher's presence state has changed, determining from the stored definition of the presence model of the target publisher for the current presence state whether the target publisher is available to communicate and, if so, a method of communication; and providing to a subscriber of the target publisher's presence information the target publisher's presence state along with the stored calendar information of the publisher and an indication of whether the target publisher is available to communicate in that presence state and if so, an indication of the method of communication.

8. The method of claim 7 including when the subscriber requests presence information of the target publisher, providing to the subscriber the target publisher's presence state along with the stored calendar information.

9. The method of claim 7 wherein the calendar information is provided to subscribers even when the target publisher is offline.

10. The method of claim 7 wherein the receiving includes receiving from the publisher incremental updates to the calendar information.

11. The method of claim 7 wherein the server is a presence server.

12. The method of claim 7 wherein the calendar information is automatically extracted from data of a calendaring system of the publisher.

13. A computer-readable medium containing instructions for controlling a computer system of a server to provide expanded presence information while publishers are offline, by a method comprising:

for each of a plurality of publishers of presence information, receiving from the publisher a definition of a presence model specifying a hierarchy of levels of presence states of the publisher and specifying presence states in which the user is offline and in which the publisher is available to communicate and a method of communication for the presence states;

storing the received definition of the presence model of the publisher;

receiving expanded presence information from the publisher of presence information, the expanded presence information being information other than the presence information defined by the presence model of the publisher;

receiving an indication of a current presence state of the publisher; and storing the expanded presence information and the indication of the current presence state in association with the publisher;

receiving from a subscriber a request to subscribe to the presence information of a target publisher;

determining from the stored definition of the presence model of the target publisher and the stored indication of the current presence state whether the target publisher's current present state is offline;

when the target publisher's current presence state is not offline, providing to the subscriber an indication of the current presence state of the target publisher and an indication of whether the target publisher is available to communicate in that presence state and a method of communication as specified by the stored definition of the presence model of the target publisher; and when the target publisher's presence state is offline, providing to the subscriber an indication that the target publisher is offline along with the stored expanded presence information for the target publisher.

14. The computer-readable medium of claim 13 including providing the expanded presence information to a subscriber when the target publisher is online.

15. The computer-readable medium of claim 13 wherein the expanded presence information includes an out-of-office message.

16. The computer-readable medium of claim 13 wherein the expanded presence information includes information automatically collected from data sources associated with the publisher.

17. The computer-readable medium of claim 13 wherein the expanded presence information includes calendar information.

18. The computer-readable medium of claim 13 including providing the expanded presence information to subscribers whenever the target publisher's presence state changes.

* * * * *